(12) United States Patent
Liang et al.

(10) Patent No.: US 9,369,751 B2
(45) Date of Patent: Jun. 14, 2016

(54) HAND-HELD POINTING DEVICE AND OPERATION METHOD THEREOF

(71) Applicant: PIXART IMAGING INC., Hsinchu (TW)

(72) Inventors: Chia-Cheun Liang, Hsinchu (TW); Chi-Yang Huang, Hsinchu (TW); Chih-Yen Wu, Hsinchu (TW); Wen-Yu Yang, Hsinchu (TW)

(73) Assignee: PIXART IMAGING INC., Hsinchu (TW)

( * ) Notice: Subject to any disclaimer, the term of this patent is extended or adjusted under 35 U.S.C. 154(b) by 208 days.

(21) Appl. No.: 14/033,354

(22) Filed: Sep. 20, 2013

(65) Prior Publication Data

US 2014/0196086 A1    Jul. 10, 2014

(30) Foreign Application Priority Data

Jan. 9, 2013  (TW) ............................. 102100750 A

(51) Int. Cl.
*H04N 21/422* (2011.01)
*G06F 3/0354* (2013.01)
*G06F 3/03* (2006.01)
*G06F 3/0346* (2013.01)

(52) U.S. Cl.
CPC ........ *H04N 21/42204* (2013.01); *G06F 3/0304* (2013.01); *G06F 3/0346* (2013.01); *G06F 3/03542* (2013.01); *H04N 21/422* (2013.01); *H04N 21/42206* (2013.01); *H04N 21/42207* (2013.01); *H04N 21/42219* (2013.01); *H04N 21/42221* (2013.01); *H04N 21/42222* (2013.01)

(58) Field of Classification Search
None
See application file for complete search history.

(56) References Cited

U.S. PATENT DOCUMENTS

| 7,295,186 | B2 * | 11/2007 | Brosnan ........................ 345/166 |
| 7,663,601 | B1 * | 2/2010 | Hotelling et al. ............. 345/163 |
| 2005/0078087 | A1 * | 4/2005 | Gates et al. .................... 345/163 |
| 2007/0139373 | A1 | 6/2007 | Simon |
| 2008/0231760 | A1 * | 9/2008 | Kibble ........................ 348/734 |
| 2009/0195501 | A1 | 8/2009 | Kuo et al. |

* cited by examiner

*Primary Examiner* — Justin Shepard
(74) *Attorney, Agent, or Firm* — Cheng-Ju Chiang

(57) ABSTRACT

A hand-held pointing device includes a main body, a processing circuit, a light emitting device and two image sensing devices. The main body has a first surface and a second surface for lying on an operating surface. The two image sensing devices are disposed in the main body and configured to sense first and second images through first and second transparent areas thereof, respectively. The light emitting device, disposed in the main body, is configured to emit a light source through the second transparent area. The processing circuit is configured to determine and operate the hand-held pointing device in a remote controller mode or a mouse mode according to whether the first image contains an image of a reference light source and/or the second image contains an image of the operating surface reflecting the light source. An operation for a hand-held pointing device is also provided.

18 Claims, 6 Drawing Sheets

HAND-HELD POINTING DEVICE AND OPERATION METHOD THEREOF

TECHNICAL FIELD

The present invention relates to a point device technique, and more particularly to a hand-held pointing device and an operation method thereof.

BACKGROUND

In order to facilitate the sharing of multimedia content in a digital home, combining the functions of smart television (TV) and computer in one family multimedia platform system is the trend in the future. For example, in order to have a larger screen, user can use a smart TV to display the content of the word processing or display the content of the computer running web browser.

Thus, it is quite necessary to develop an input device (e.g., hand-held point device) for supporting the smart TVs and computer both.

SUMMARY OF EMBODIMENTS

The present invention provides a hand-held pointing device capable of being operated in either a remote controller mode or in a mouse mode; thus, the hand-held pointing device can support the operation of a smart TV and a computer both.

The present invention further provides an operation method for the aforementioned hand-held pointing device.

The present invention still further provides a hand-held pointing device capable of being operated in either a remote controller mode or in a mouse mode; thus, the hand-held pointing device can support the operation of a smart TV and a computer both.

An embodiment of the present invention provides a hand-held pointing device, which includes a main body, a first image sensing device, a light emitting device, a second image sensing device and a processing circuit. The main body has an axial direction, a first surface and a second surface. The hand-held pointing device can be hold along the axial direction. The first surface and the second surface include a first transparent area and a second transparent area, respectively. The second surface is parallel to the axial direction and for lying on an operating surface. The first image sensing device is disposed in the main body and configured to sense a first image through the first transparent area. The light emitting device is disposed in the main body and configured to emit a light source through the second transparent area. The second image sensing device is disposed in the main body and configured to sense a second image through the second transparent area. The processing circuit is configured to generate a first determination result by determining whether the first image contains an image of a reference light source or not, generate a second determination result by determining whether the second image contains an image of the operating surface reflecting the light source or not, and determine and operate the hand-held pointing device either in a remote controller mode or in a mouse mode according to the first and second determination results.

Another embodiment of the present invention provides an operation method for a hand-held pointing device. The hand-held pointing device includes a main body, a first image sensing device, a light emitting device and a second image sensing device. The main body has an axial direction, a first surface and a second surface. The hand-held pointing device can be hold along the axial direction. The first surface and the second surface include a first transparent area and a second transparent area, respectively. The second surface is parallel to the axial direction and for lying on an operating surface. The first image sensing device is disposed in the main body and configured to sense a first image through the first transparent area. The light emitting device is disposed in the main body and configured to emit a light source through the second transparent area. The second image sensing device is disposed in the main body and configured to sense a second image through the second transparent area. The operation method includes: generating a first determination result by determining whether the first image contains an image of a reference light source or not; generating a second determination result by determining whether the second image contains an image of the operating surface reflecting the light source or not; and determining and operating the hand-held pointing device either in a remote controller mode or in a mouse mode according to the first and second determination results.

Still another embodiment of the present invention provides hand-held pointing device, which includes a main body, at least an image sensing device, a light emitting device and a processing circuit. The main body has a first surface and a second surface. The first surface and the second surface include a first transparent area and a second transparent area, respectively. The image sensing device is configured to sense a first image and a second image through the first transparent area and the second transparent area, respectively. The light emitting device is configured to emit a light source to the second transparent area while the image sensing device is sensing the second image. The processing circuit is configured to control the image sensing device to sense the second image, determine a luminance parameter of the second image, and determine either to control the image sensing device to switch to sense the first image or keep sensing the second image according to the determined luminance parameter.

By being constituted with a main body, a first image sensing device, a light emitting device, a second image sensing device and a processing circuit with specific design and arrangement and configuring the processing circuit to generate a first determination result by determining whether a first image contains an image of a reference light source or not, generate a second determination result by determining whether a second image contains an image of the operating surface reflecting a light source or not, and determine and operate the hand-held pointing device either in a remote controller mode or in a mouse mode according to the first and second determination results, the hand-held pointing device in accordance with an embodiment of the present invention can support the operation of a smart TV and a computer both.

Moreover, by being constituted with the aforementioned main body, at least an image sensing device, a light emitting device and a processing circuit, configuring the light emitting device to emit a light source to a second transparent area while the image sensing device is sensing a second image and configuring the processing circuit to control the image sensing device to sense the second image, determine a luminance parameter of the second image, and determine either to control the image sensing device to switch to sense the first image or keep sensing the second image according to the determined luminance parameter, the hand-held pointing device in accordance with another embodiment of the present invention can support the operation of a smart TV and a computer both.

BRIEF DESCRIPTION OF THE DRAWINGS

The above embodiments will become more readily apparent to those ordinarily skilled in the art after reviewing the following detailed description and accompanying drawings, in which.

DETAILED DESCRIPTION OF PREFERRED EMBODIMENTS

The disclosure will now be described more specifically with reference to the following embodiments. It is to be noted that the following descriptions of preferred embodiments are presented herein for purpose of illustration and description only. It is not intended to be exhaustive or to be limited to the precise form disclosed.

Figure 1:
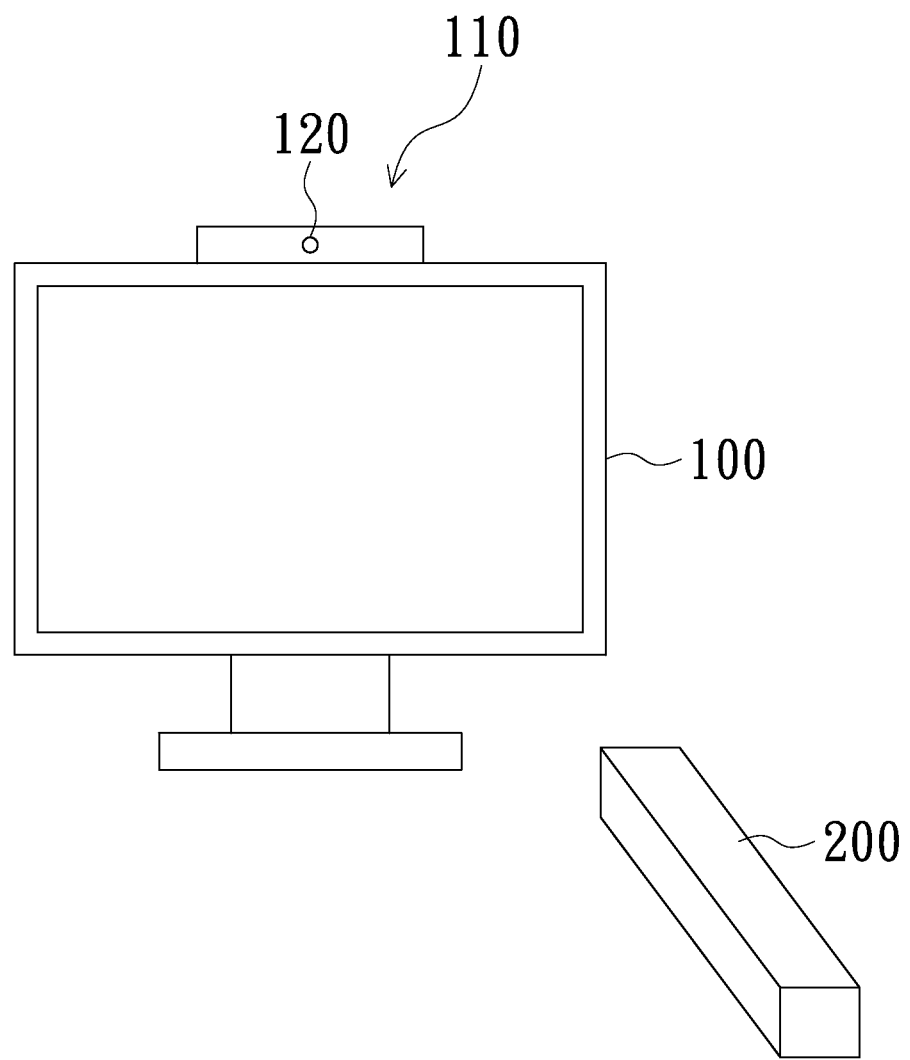
FIG. 1 is a schematic view of a hand-held pointing device in accordance with an embodiment of the present invention and its associated smart TV.

FIG. 1 is a schematic view of a hand-held pointing device 200 in accordance with an embodiment of the present invention and its associated smart television (TV) 100. As shown, a light bar 110 is disposed on the smart TV 100; wherein the light bar 110 is adopted to be used with the hand-held pointing device 200 and includes a light emitting element 120. The light emitting element 120 is configured to emit a reference light source; and the intersecting operation between the light emitting element 120 and the hand-held pointing device 200 will be described in detail later.

Figure 2:
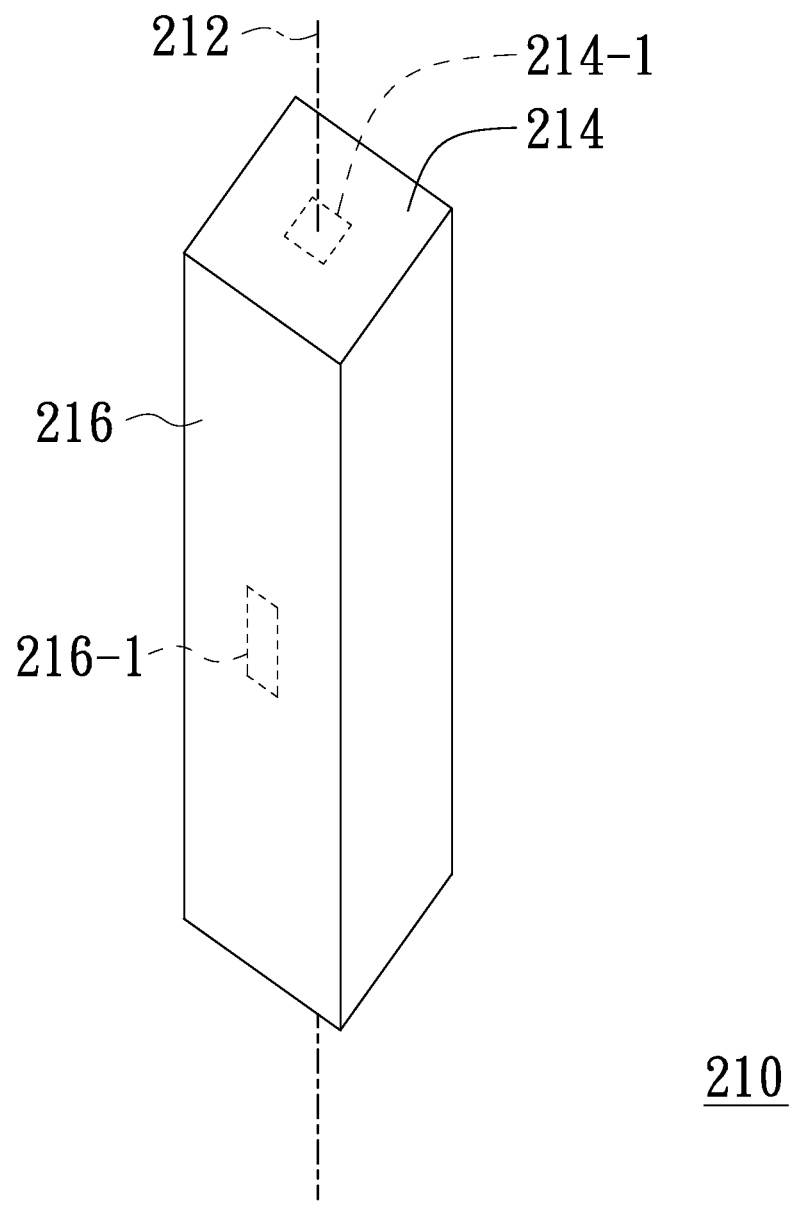
FIG. 2 is a schematic view of a main body.

The hand-held pointing device 200 mainly includes a main body, a light emitting device, a processing circuit and two image sensing devices; wherein the light emitting device, the processing circuit and the two image sensing devices are disposed in the main body. FIG. 2 is a schematic view of the aforementioned main body. As shown, the main body 210 has an axial direction 212, along which a user can hold the main body 210. The main body 210 further has two surfaces 214, 216; wherein the surface 216 is parallel to the axial direction 212 and for lying on an operating surface (e.g., a table surface). In addition, the surfaces 214, 216 have transparent areas 214-1, 216-1, respectively.

Figure 3:
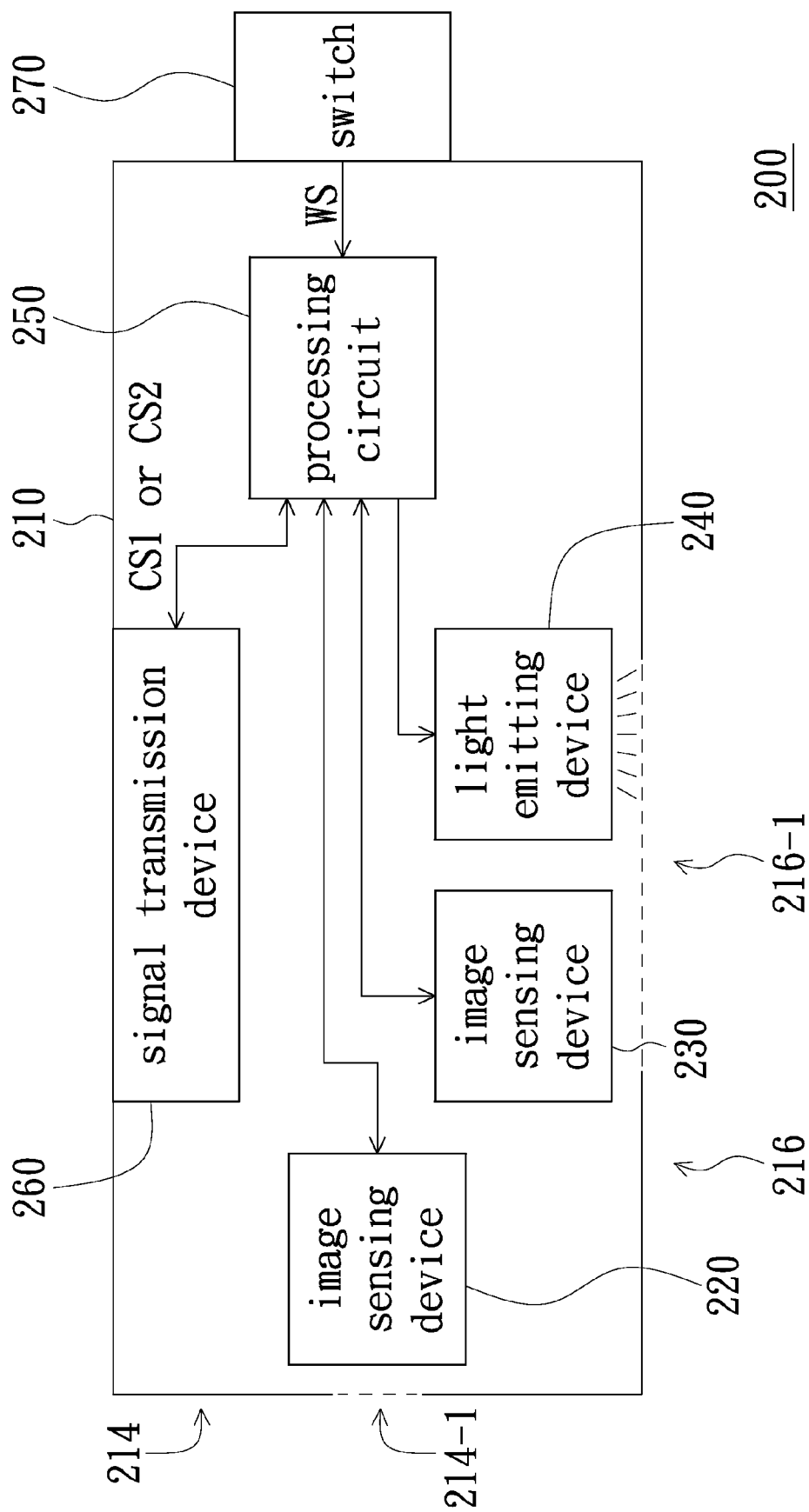
FIG. 3 is a side cross-sectional view of a hand-held pointing device shown in FIG. 2.

The arrangement relationship among the light emitting device, the processing circuit and the two image sensing devices in the main body 210 is schematically illustrated in FIG. 3, which is a side cross-sectional view of the hand-held pointing device 200. As shown, an image sensing device 220 is configured to sense a first image through the transparent area 214-1. A light emitting device 240 is configured to emit a light source through the transparent area 216-1. An image sensing device 230 is configured to sense a second image through the transparent area 216-1. The processing circuit 250 is electrically connected to the image sensing devices 220, 230 and the light emitting device 240.

The processing circuit 250 is configured to receive the first image sensed by the image sensing device 220 and the second image sensed by the image sensing device 230, generate a first determination result by determining whether the received first image contains an image of the reference light source emitted from the light emitting element 120 (FIG. 1) or not, and generate a second determination result by determining whether the received second image contains an image of the operating surface reflecting the light source emitted from the light emitting device 240 or not. For example, the processing circuit 250 may determine whether the received first image contains an image of the reference light source emitted from the light emitting element 120 or not based on a first luminance threshold; and determine whether the received second image contains an image of the operating surface reflecting the light source emitted from the light emitting device 240 or not based on a second luminance threshold. In addition, the processing circuit 250 is further configured to operate the hand-held pointing device 200 either in a remote controller mode or in a mouse mode according to the first determination result and the second determination result. In further, the processing circuit 250 can be switched to the mouse mode only according to the first determination result when the processing circuit 250 operated in the remote controller mode previously and can be switched to the remote controller mode only according to the second determination result when the processing circuit 250 operated in the mouse mode previously Please refer to both FIGS. 1, 3. Specifically, the transparent area 214-1 of the hand-held pointing device 200 is determined, by the processing circuit 250, to point to a screen of the smart TV 100 if the first image contains the image of the reference light source emitted from the light emitting element 120, due to the reference light source emitted from the light emitting element 120 may emit to the image sensing device 220 through the transparent area 214-1 when the transparent area 214-1 is pointing to the screen of the smart TV 100. There exists no any operating surface under the transparent area 216-1 of the hand-held pointing device 200 or there exists a certain distance between an operating surface and the transparent area 216-1 if the second image does not contain an image of the operating surface reflecting the light source emitted from the light emitting device 240, due to the light source emitted from the light emitting device 240 may not reflect back to the image sensing device 230 through the transparent area 216-1 if there exists no any operating surface under the transparent area 216-1 or there exists a certain distance between an operating surface and the transparent area 216-1.

For example, the transparent area 216-1 of the hand-held pointing device 200 is determined to have a distance, relative to an operating surface, smaller than a specific value if the second image has a luminance greater than or equal to the second luminance threshold; alternatively, there exists no any operating surface under the transparent area 216-1 or there exists a certain distance between an operating surface and the transparent area 216-1 if the second image has a luminance smaller than the second luminance threshold. Therefore, if the second image has a luminance smaller than the second luminance threshold, the processing circuit 250 determines that there exists no image of the operating surface reflecting the light source emitted from the light emitting device 240 in the second image. The luminance of the second image herein is an average luminance of all pixels in the second image, or an average luminance of a predetermined percentage of pixels in the second image (for example, an average luminance of the first 30% or 50% pixels having the highest luminance in the second image). Thus, if the first image contains the image of the reference light source emitted from the light emitting element 120 and/or the second image does not contain an image of the operating surface reflecting the light source emitted from the light emitting device 240, the processing circuit 250 determines that the hand-held pointing device 200 is being functioned as a remote controller and accordingly operates the hand-held pointing device 200 in a remote controller mode.

Alternatively, the transparent area 214-1 of the hand-held pointing device 200 is determined, by the processing circuit 250, not to point to a screen of the smart TV 100 if the first image does not contain the image of the reference light source emitted from the light emitting element 120, due to the reference light source emitted from the light emitting element 120 cannot emit to the image sensing device 220 through the transparent area 214-1 when the transparent area 214-1 is not pointing to the screen of the smart TV 100. The transparent area 216-1 of the hand-held pointing device 200 is determined, by the processing circuit 250, to lie on an operating surface if the second image contains an image of the operating surface reflecting the light source emitted from the light emitting device 240, due to the light source emitted from the light emitting device 240 is able to be reflected back to the image sensing device 230 through the transparent area 216-1 if there exists an operating surface under the transparent area 216-1. Thus, if the first image does not contain the image of the reference light source emitted from the light emitting element 120 and/or the second image contains an image of the operating surface reflecting the light source emitted from the light emitting device 240, the processing circuit 250 determines that the hand-held pointing device 200 is being functioned as a mouse and accordingly operates the hand-held pointing device 200 in a mouse mode.

Moreover, when deciding to operate the hand-held pointing device 200 in a remote controller mode, the processing circuit 250 is further configured to calculate a relative position of the reference light source emitted from the light emitting element 120 in the first image and accordingly output a first control signal CS1. Alternatively, when deciding to operate the hand-held pointing device 200 in mouse mode, the processing circuit 250 is further configured to calculate a relative displacement of the main body 210 according to the texture feature of the operating surface in the second image and accordingly output a second control signal CS2. For transmitting the first control signal CS1 and the second control signal CS2, the hand-held pointing device 200 is further disposed with a signal transmission device 260 therein. The signal transmission device 260 is electrically connected to the processing circuit 250 and configured to transmit the first control signal CS1 and the second control signal CS2 to a back-end circuit (e.g., a computer, not shown) of the hand-held pointing device 200. Furthermore, the hand-held pointing device 200 may further include a switch 270, which is disposed on the main body 210 and configured to provide a switching signal WS; wherein the processing circuit 250 may directly switch the hand-held pointing device 200 either in the remote controller mode or the mouse mode according to the switching signal WS.

In advance, the hand-held pointing device 200 in another embodiment may be further designed with a sleep mode. Specifically, the processing circuit 250 may be further configured to operate the hand-held pointing device 200 in sleep mode if the first image does not contain an image of the reference light source emitted from the light emitting element 120 and the second image does not contain an image of the operating surface reflecting the light source emitted from the light emitting device 240; or, the first image does not contain the image of the reference light source emitted from the light emitting element 120 and the second image contains the image of the operating surface reflecting the light source emitted from the light emitting device 240, but the main body 210 has a relative displacement smaller than a predetermined value within a predetermined time. A small tolerance may be designed for the sleep mode, such as four times with no image reflecting the light source in the first image and with relative displacements smaller than the predetermined value.

Accordingly, because being operable in either the remote controller mode or the mouse mode, the hand-held pointing device 200 is able to control the operations of the smart TV 100 and a computer (not shown) both if the processing circuit 250 is implemented with the functions of processors of a remote controller and a mouse.

It is understood, by those ordinarily skilled in the art, that the hand-held pointing device of the present invention may be implemented by one image sensing device only if the hand-held pointing device is further disposed with either a rotation mechanism or a multipath optical element, which are configured to assist the image sensing device to switch for sensing the first image or the second image. The hand-held pointing device equipped with a rotation mechanism will be exemplarily described in detail with reference of FIG. 4 in follow.

Figure 4:
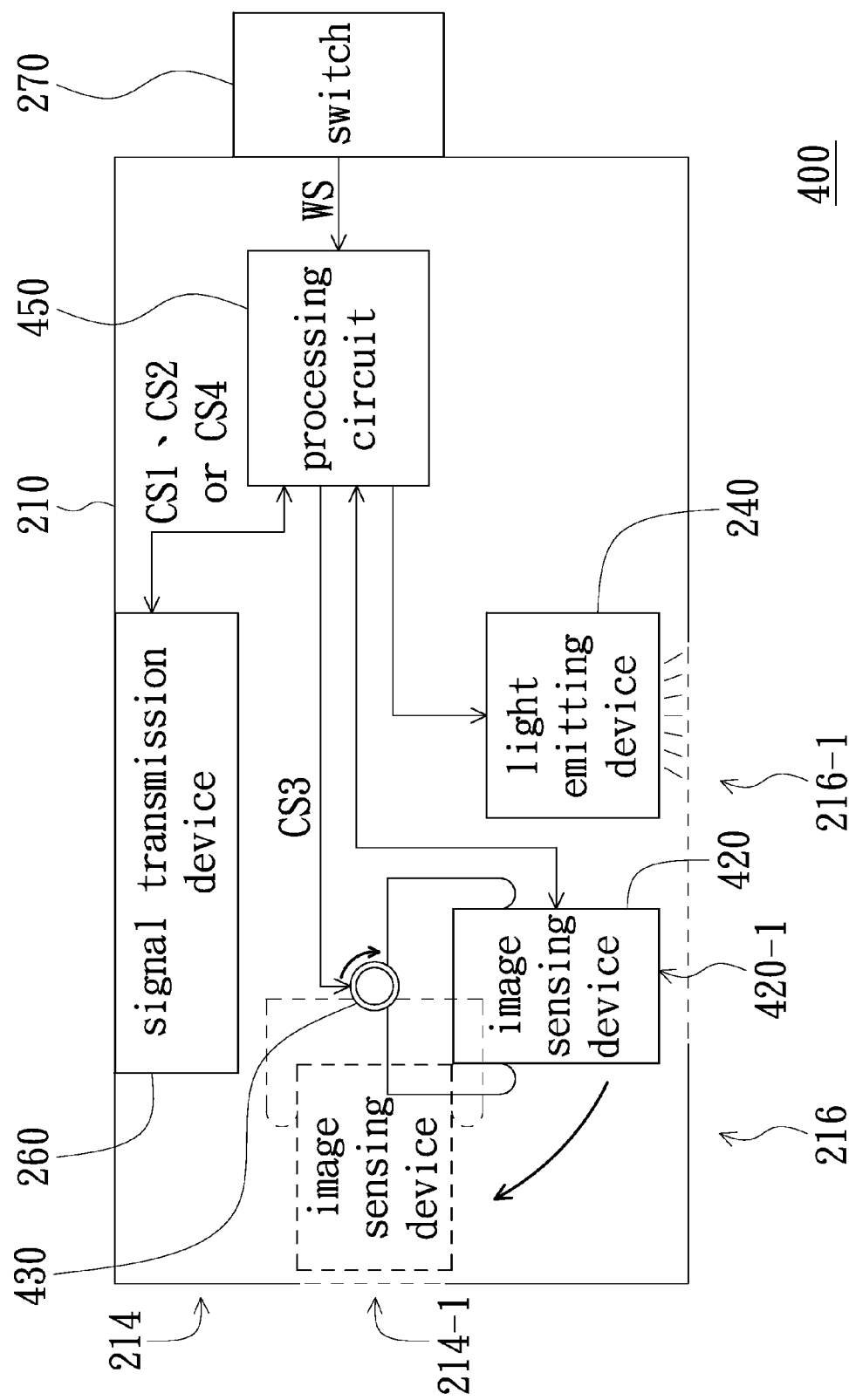
FIG. 4 is a side cross-sectional view of a hand-held pointing device in accordance with another embodiment of the present invention.

FIG. 4 is a side cross-sectional view of a hand-held pointing device in accordance with another embodiment of the present invention; wherein the same label in the hand-held pointing device 400 in this embodiment and the hand-held pointing device 200 shown FIG. 3 represents the same object or signal. As shown, the main difference between the hand-held pointing device 400 in this embodiment and the hand-held pointing device 200 shown in FIG. 2 is that the hand-held pointing device 400 further includes a rotation mechanism 430 and adopts one image sensing device 420 only. The rotation mechanism 430 is configured to assist the image sensing device 420 to switch for sensing the first image or the second image. In addition, the operations between the processing circuits 450, 250 may have some differences; and the detail will be described in follow.

The rotation mechanism 430 may be realized by an electrically-controlled rotation mechanism. Accordingly, the processing circuit 450 is configured to output a third control signal CS3 to the rotation mechanism 430; wherein the third control signal CS3 is for controlling a rotational operation of the rotation mechanism 430. In this embodiment, the processing circuit 450 is configured to control the light emitting device 240 to emit a light source only when the image sensing device 420 is controlled, by the processing circuit 450, to sense the second image through the transparent area 216-1. Additionally, in this embodiment, the processing circuit 450 is further configured to control the image sensing device 420 to sense the second image first, determine a luminance parameter of the second image, and accordingly selectively control the image sensing device 420 to switch to sense the first image through the transparent area 214-1 or keep sensing the second image through the transparent area 216-1. The luminance parameter herein is an average luminance of all pixels in the second image, or an average luminance of a predetermined percentage of pixels in the second image (for example, an average luminance of the first 30% or 50% pixels having the highest luminance in the second image). Specifically, the processing circuit 450 is configured to control the rotation of the rotation mechanism 430 and thereby switching the image sensing device 420 to sense the first image if the luminance parameter of the second image is smaller than a threshold.

In one embodiment, the processing circuit 450 is further configured to perform pointing operation and mouse operation based on the first image and the second image sensed by the image sensing device 420, respectively. In addition, the processing circuit 450 may be further configured to adopt various algorithms for perform an image processing on the first and second images and thereby obtaining a pointing coordinate for the pointing operation and a relative displacement for the mouse operation, respectively. Moreover, in one embodiment, the processing circuit 450 is, while the image sensing device 420 is sensing the first image, further configured to transmit a fourth control signal CS4 to an external light source (herein the external light source includes a corresponding signal receiver device and a corresponding control circuit) through the signal transmission device 260, and thereby further controlling the external light source to emit light. For example, if the light bar 110 in FIG. 1 further includes a corresponding signal receiver device and a corresponding control circuit, then the processing circuit 450 may bale to control the light emitting element 120 of the light bar 110 to emit light while the image sensing device 420 is sensing the first image.

Figure 5:
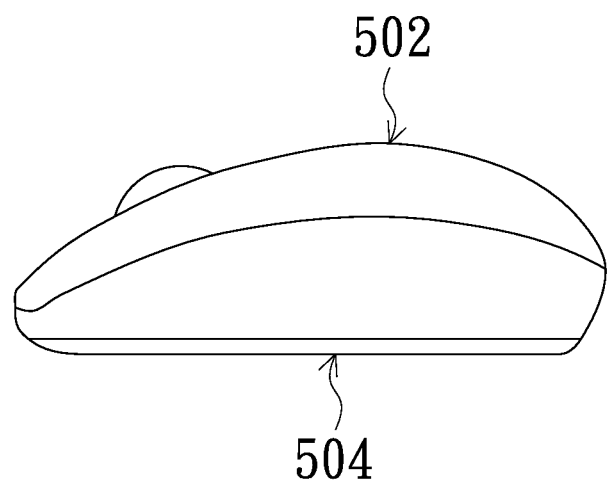
FIG. 5 is a schematic view of a mouse device.

The main body 210 exemplified in FIG. 2 has six surfaces; however, it is to be noted that the present invention is not limited thereto. In other words, the main body 210 may have other shapes. For example, the main body 210 may have a mouse appearance with surfaces 502, 504 as illustrated in FIG. 5. In addition, the arrangement position of the number and, in another embodiment; wherein As shown, the light bar 110 illustrated in FIG. 1 and the number of the light emitting elements therein are used for the exemplary purpose only; and the present invention is not limited thereto.

Figure 6:
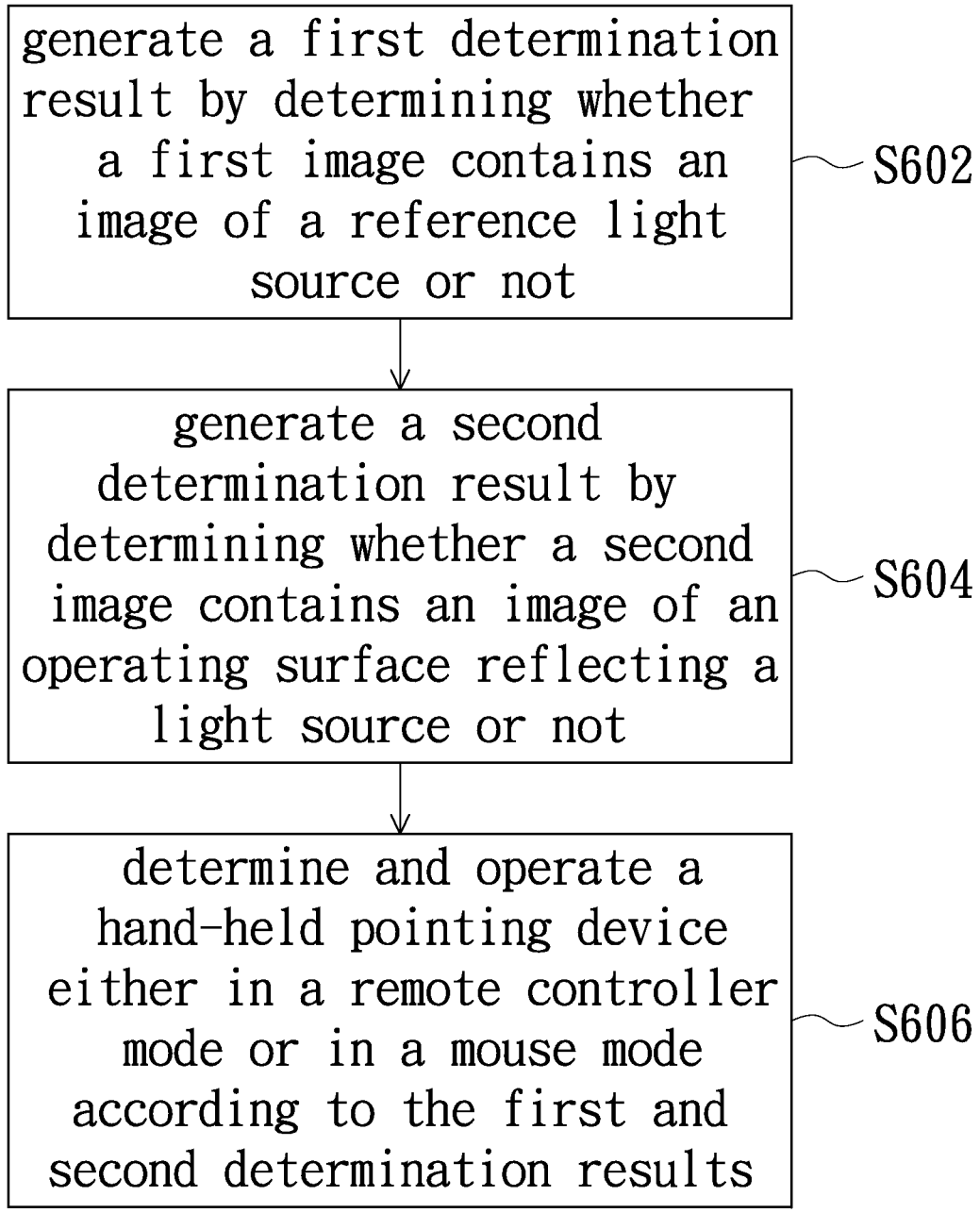
FIG. 6 is a flowchart illustrating an operation method for a hand-held pointing device in accordance with an embodiment of the present invention.

According to the aforementioned disclosed system embodiments, an operation method for a hand-held pointing device can be summarized by those ordinarily skilled in the art to have some basic operation steps as illustrated in FIG. 6, which is a flowchart illustrating an operation method for a hand-held pointing device in accordance with an embodiment of the present invention. The hand-held pointing device includes a main body, a first image sensing device, a light emitting device and a second image sensing device. The main body has an axial direction, a first surface and a second surface. The hand-held pointing device can be hold along the axial direction. The first surface and the second surface include a first transparent area and a second transparent area, respectively. The second surface is parallel to the axial direction and for lying on an operating surface. The first image sensing device is disposed in the main body and configured to sense a first image through the first transparent area. The light emitting device is disposed in the main body and configured to emit a light source through the second transparent area. The second image sensing device is disposed in the main body and configured to sense a second image through the second transparent area. As illustrated in FIG. 6, the operation method includes: generating a first determination result by determining whether the first image contains an image of a reference light source or not (step S602); generating a second determination result by determining whether the second image contains an image of the operating surface reflecting the light source or not (step S604); and determining and operating the hand-held pointing device either in a remote controller mode or in a mouse mode according to the first and second determination results (step S606).

In summary, by being constituted with a main body, a first image sensing device, a light emitting device, a second image sensing device and a processing circuit with specific design and arrangement and configuring the processing circuit to generate a first determination result by determining whether a first image contains an image of a reference light source or not, generate a second determination result by determining whether a second image contains an image of the operating surface reflecting a light source or not, and determine and operate the hand-held pointing device either in a remote controller mode or in a mouse mode according to the first and second determination results, the hand-held pointing device in accordance with an embodiment of the present invention can support the operation of a smart TV and a computer both.

Moreover, by being constituted with the aforementioned main body, at least an image sensing device, a light emitting device and a processing circuit, configuring the light emitting device to emit a light source to a second transparent area while the image sensing device is sensing a second image and configuring the processing circuit to control the image sensing device to sense the second image, determine a luminance parameter of the second image, and determine either to control the image sensing device to switch to sense the first image or keep sensing the second image according to the determined luminance parameter, the hand-held pointing device in accordance with another embodiment of the present invention can support the operation of a smart TV and a computer both.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A hand-held pointing device, comprising:
a main body comprising an axial direction, a first surface and a second surface, wherein the hand-held pointing device can be hold along the axial direction, the first surface and the second surface comprise a first transparent area and a second transparent area, respectively, the second surface is parallel to the axial direction and for lying on an operating surface;
a first image sensing device disposed in the main body and configured to sense a first image through the first transparent area;
a light emitting device disposed in the main body and configured to emit a light source through the second transparent area;
a second image sensing device disposed in the main body and configured to sense a second image through the second transparent area; and
a processing circuit configured to activate the second image sensing device to sense the second image for generating a second determination result when a first luminance of the first image lower than a first luminance threshold or activate the first image sensing device to sense the first image for generating a first determination result when a second luminance of the second image lower than a second luminance threshold, and determine and operate the hand-held pointing device either in a remote controller mode or in a mouse mode according to the first determination result or the second determination result.

2. The hand-held pointing device according to claim 1, wherein the processing circuit is configured to determine and operate the hand-held pointing device in the remote controller mode if the first image contains the image of a reference light source and the second image does not contain the image of the operating surface reflecting the light source; wherein the processing circuit is configured to determine and operate the hand-held pointing device in the mouse mode if the first image does not contain the image of the reference light source and the second image contains the image of the operating surface reflecting the light source.

3. The hand-held pointing device according to claim 2, wherein the processing circuit is, when determining and operating the hand-held pointing device in the remote controller mode, configured to calculate a relative position of the reference light source in the first image and accordingly output a first control signal; wherein the processing circuit is, when determining and operating the hand-held pointing device in the mouse mode, configured to calculate a relative displacement of the main body according to a texture feature of the operating surface in the second image and accordingly output a second control signal.

4. The hand-held pointing device according to claim 3, further comprising a signal transmission device electrically connected to the processing circuit and configured to transmit the first and second control signals to a back-end circuit of the hand-held pointing device.

5. The hand-held pointing device according to claim 2, wherein the processing circuit is further configured to determine and operate the hand-held pointing device in a sleep mode if the first image does not contain the image of the reference light source and the second image does not contain the image of the operating surface reflecting the light source, or, the first image does not contain the image of the reference light source and the second image contains the image of the operating surface reflecting the light source but the main body has a relative displacement smaller than a predetermined value within a predetermined time.

6. The hand-held pointing device according to claim 1, wherein the processing circuit determines whether the first image contains the image of a reference light source or not according to a first luminance threshold and determines whether the second image contains the image of the operating surface reflecting the light source or not according to a second luminance threshold.

7. The hand-held pointing device according to claim 1, further comprising a switch disposed on the main body and configured to provide a switching signal, wherein the processing circuit is further configured to directly switch the hand-held pointing device either in the remote controller mode or the mouse mode according to the switching signal.

8. An operation method for a hand-held pointing device, the hand-held pointing device comprising a main body, a first image sensing device, a light emitting device and a second image sensing device, the main body comprising an axial direction, a first surface and a second surface, wherein the hand-held pointing device can be hold along the axial direction, the first surface and the second surface comprising a first transparent area and a second transparent area, respectively, the second surface being parallel to the axial direction and for lying on an operating surface, the first image sensing device being disposed in the main body and configured to sense a first image through the first transparent area, the light emitting device being disposed in the main body and configured to emit a light source through the second transparent area, the second image sensing device being disposed in the main body and configured to sense a second image through the second transparent area, the operation method comprising:
 activating the second image sensing device to sense the second image for generating a second determination result when a first luminance of the first image lower than a first luminance threshold or activate the first image sensing device to sense the first image for generating a first determination result when a second luminance of the second image lower than a second luminance threshold; and
 determining and operating the hand-held pointing device either in a remote controller mode or in a mouse mode according to the first and second determination results.

9. The operation method according to claim 8, wherein the hand-held pointing device is determined and operated in the remote controller mode if the first image contains the image of a reference light source and the second image does not contain the image of the operating surface reflecting the light source; wherein the hand-held pointing device is determined and operated in the mouse mode if the first image does not contain the image of the reference light source and the second image contains the image of the operating surface reflecting the light source.

10. The operation method according to claim 9, further comprising:
 calculating, wherein the hand-held pointing device is determined and operated in the remote controller mode, a relative position of the reference light source in the first image and accordingly outputting a first control signal; or
 calculating, wherein the hand-held pointing device is determined and operated in the mouse mode, a relative displacement of the main body according to a texture feature of the operating surface in the second image and accordingly outputting a second control signal.

11. The operation method according to claim 10, further comprising:
 configuring a signal transmission device to transmit the first and second control signals to a back-end circuit of the hand-held pointing device.

12. The operation method according to claim 9, further comprising:
 determining and operating the hand-held pointing device in a sleep mode if the first image does not contain the image of the reference light source and the second image does not contain the image of the operating surface reflecting the light source, or, the first image does not contain the image of the reference light source and the second image contains the image of the operating surface reflecting the light source but the main body has a relative displacement smaller than a predetermined value within a predetermined time.

13. The operation method according to claim 8, wherein the determination of the first image whether contains the image of a reference light source or not is based on a first luminance threshold and the determination of the second image whether contains the image of the operating surface reflecting the light source or not is based on a second luminance threshold.

14. A hand-held pointing device, comprising:
 a main body comprising a first surface and a second surface, wherein the first surface and the second surface comprise a first transparent area and a second transparent area, respectively;
 at least an image sensing device configured to sense a first image and a second image through the first transparent area and the second transparent area, respectively;
 a light emitting device configured to emit a light source to the second transparent area while the image sensing device is sensing the second image; and
 a processing circuit configured to control the image sensing device to sense the second image, determine a luminance parameter of the second image, and determine either to switch the image sensing device for sensing the first image or to keep sensing the second image according to the determined luminance parameter of the second image.
 wherein the luminance parameter comprises an average luminance of all pixels in the second image, or, an average luminance of a predetermined percentage of pixels having a relatively high luminance in the second image.

15. The hand-held pointing device according to claim 14, wherein the processing circuit is configured to control the image sensing device to switch to sense the first image when the luminance parameter of the second image is smaller than a threshold value.

16. The hand-held pointing device according to claim 14, wherein the processing circuit is further configured to provide a pointing operation and a mouse operation according to the first image and the second image sensed by the image sensing device, respectively.

17. The hand-held pointing device according to claim 16, wherein the processing circuit is further configured to obtain a pointing coordinate and a relative displacement by adopting a first algorithm and a second algorithm for performing an image processing on the first image and the second image sensed by the image sensing device, respectively.

18. The hand-held pointing device according to claim 14, further comprising a signal transmission device, wherein the processing circuit is further configured to control, through the signal transmission device, an external light source to emit light while the image sensing device is sensing the first image.

* * * * *